United States Patent
Ohnstad et al.

(10) Patent No.: US 8,043,676 B2
(45) Date of Patent: Oct. 25, 2011

(54) SEALING-REACTION, LAYER-EFFECTIVE, STEALTH LINER FOR SYNTHETIC FUEL CONTAINER

(75) Inventors: Thomas S. Ohnstad, Salem, OR (US); Russell A. Monk, Salem, OR (US)

(73) Assignee: High Impact Technology, L.L.C., Tigard, OR (US)

( * ) Notice: Subject to any disclaimer, the term of this patent is extended or adjusted under 35 U.S.C. 154(b) by 594 days.

(21) Appl. No.: 12/228,758

(22) Filed: Aug. 15, 2008

(65) Prior Publication Data

US 2009/0050629 A1    Feb. 26, 2009

Related U.S. Application Data

(60) Provisional application No. 60/965,187, filed on Aug. 17, 2007.

(51) Int. Cl.
*B32B 25/02* (2006.01)
*B32B 25/04* (2006.01)
*B32B 27/40* (2006.01)
*F17C 13/00* (2006.01)

(52) U.S. Cl. .............. 428/35.7; 428/105; 428/411.1; 428/423.1; 428/911; 428/912; 220/560.02; 220/900

(58) Field of Classification Search .............. 428/35.7, 428/105, 411.1, 423.1, 911, 912; 220/560.02, 220/900
See application file for complete search history.

(56) References Cited

U.S. PATENT DOCUMENTS

| | | |
|---|---|---|
| 2,403,836 A | 7/1946 | Wagner |
| 2,605,138 A | 7/1952 | Paasche |
| 3,509,016 A | 4/1970 | Underwood et al. |
| 3,606,154 A | 9/1971 | Tufts |
| 3,664,904 A | 5/1972 | Cook |
| 3,676,197 A | 7/1972 | Harrison et al. |
| 3,698,587 A | 10/1972 | Baker et al. |
| 3,801,425 A | 4/1974 | Cook |
| 4,115,616 A | 9/1978 | Heitz et al. |
| 4,197,092 A | 4/1980 | Bretz |
| 4,216,803 A | 8/1980 | Hall |
| 4,345,698 A | 8/1982 | Villemain |
| 4,352,851 A | 10/1982 | Heitz et al. |
| 4,422,561 A | 12/1983 | Grosvenor et al. |
| 4,529,626 A | 7/1985 | Baker et al. |

(Continued)

OTHER PUBLICATIONS

USPTO Office Action, U.S. Appl. No. 12/380,344, dated Sep. 4, 2009, 9 pages total.

(Continued)

*Primary Examiner* — Thao T. Tran
(74) *Attorney, Agent, or Firm* — Jon M. Dickinson; Robert D. Varitz

(57) ABSTRACT

A method, and a self-sealing, layer-effect, stealth-reaction liner, for sealing against fuel leakage from the wound-punctured wall of an FT synthetic liquid fuel container. The liner includes (a) an elastomeric body defined by spaced, opposite faces, formed of a material which is non-reactive to FT fuel, and (b) nominally shrouded in a region within the liner body, inwardly of the faces, a distribution of liquid-imbiber beads which react to contact with FT fuel to initiate liquid-imbibing and material-swelling actions. The method includes (a) preparing, for installation in such a container, a liner with a non-fuel-reactive, substantially continuous-material elastomeric body having opposite faces, and (b) within that body, a non-facially exposed, normally body-shrouded, central distribution of fuel-reactive liquid-imbiber beads.

4 Claims, 1 Drawing Sheet

U.S. PATENT DOCUMENTS

| | | | |
|---|---|---|---|
| 4,728,711 | A | 3/1988 | Rosthauser et al. |
| 4,783,340 | A | 11/1988 | McDonell et al. |
| 4,799,454 | A | 1/1989 | Ito |
| 4,808,042 | A | 2/1989 | Muehlberger et al. |
| 5,306,867 | A | 4/1994 | Connole et al. |
| 5,463,791 | A | 11/1995 | Roden |
| 5,472,743 | A | 12/1995 | Daluise |
| 6,040,356 | A | 3/2000 | Kanki et al. |
| 6,358,580 | B1 | 3/2002 | Mang et al. |
| 6,432,882 | B1 | 8/2002 | Yamamoto |
| 6,803,400 | B1 | 10/2004 | Butterbach et al. |
| 7,169,452 | B1 | 1/2007 | Monk et al. |
| 7,220,455 | B2 * | 5/2007 | Bennett et al. ............. 427/407.1 |
| 7,229,673 | B1 | 6/2007 | Monk et al. |
| 7,381,287 | B2 | 6/2008 | Monk et al. |
| 7,393,572 | B1 | 7/2008 | Monk et al. |
| 7,732,028 | B2 * | 6/2010 | Monk et al. .................. 428/35.7 |
| 2004/0065456 | A1 | 4/2004 | Belli et al. |
| 2005/0084334 | A1 | 4/2005 | Shi et al. |
| 2006/0269680 | A1 | 11/2006 | Bennett et al. |

OTHER PUBLICATIONS

USPTO Office Action, U.S. Appl. No. 12/380,344, dated Feb. 19, 2010, 11 pages total.

USPTO Office Action, U.S. Appl. No. 12/380,361, dated Aug. 4, 2010, 10 pages total.

USPTO Office Action, U.S. Appl. No. 12/380,361, dated Jan. 14, 2011, 8 pages total.

USPTO Office Action, U.S. Appl. No. 12/454,243, dated Apr. 13, 2010, 10 pages total.

USPTO Office Action, U.S. Appl. No. 11/637,591, dated Dec. 24, 2008, 22 pages total.

USPTO Office Action, U.S. Appl. No. 11/637,591, dated Sep. 29, 2009, 15 pages total.

USPTO Office Action, U.S. Appl. No. 11/637,591, dated Jun. 10, 2010, 13 pages total.

USPTO Office Action, U.S. Appl. No. 11/637,591, dated Dec. 9, 2010, 11 pages total.

USPTO Office Action, U.S. Appl. No. 12/381,432, dated Feb. 2, 2011, 16 pages total.

* cited by examiner

SEALING-REACTION, LAYER-EFFECTIVE, STEALTH LINER FOR SYNTHETIC FUEL CONTAINER

CROSS REFERENCE TO RELATED APPLICATION

This application claims filing date priority to prior-filed, currently-co-pending U.S. Provisional Patent Application, Ser. No. 60/965,187, filed Aug. 17, 2007, for "Fuel-Tank Sealing Lining". The entire disclosure content of this prior-filed provisional application is hereby incorporated herein by reference.

BACKGROUND AND SUMMARY OF THE INVENTION

This invention, which has both civilian and military values, pertains to a stealth, layer-effective (or layer-effect), sealing-reaction (stealth-reaction) liner, useable adjacent the inner surface area of a vehicle's synthetic-fuel tank, and structured to provide a rapid and robust, self-sealing, anti-leakage reaction to a tank-wall puncture wound, such as a bullet wound. More specifically, this invention pertains to such a liner which is designed, until such a puncture wound, or breach, occurs, and although always in direct "normal" contact with synthetic fuel, to be normally "dormant" within the fuel-containing tank environment in what might be thought of as a "stealth mode", but which is effective immediately, through interactive reaction to and with breach-produced, leaking fuel, to react, in a realm within the liner formed as an inner, or central, initially shrouded layer region containing synthetic-fuel-reactive liquid-imbiber beads, to such leakage quickly to seal such a wound.

A preferred and best-mode embodiment of the invention is described herein generally in a military setting, and in relation to a particular, illustrative, synthetic vehicle-motor fuel referred to as FT synthetic fuel, made by a South African company named Fisher-Tropsch—a fuel which is now being used in many military-vehicle fuel tanks.

The invention specifically takes its very useful place in an environment where, as is now progressively the case, conventional "natural" motor fuels are being replaced by synthetic fuels.

It has been conventional practice in the past to line military fuel tanks with an inside lining, or bladder, formed of a defined-thickness natural rubber material, and always, heretofore, in the context of the relevant container being one which holds conventional, or "natural" engine fuel. In such a setting, it is the practice to furnish an additional barrier layer which resides between the natural-rubber lining, or bladder, and the fuel, and specifically a barrier layer formed of a material which is nonreactive with regard to conventional natural motor fuel, in order to isolate the natural-rubber lining from direct, normal contact with fuel contained in such a tank.

With regard to puncture wounds created in such a setting, i.e., one where natural petroleum-based fuel is employed, it is definitively the case that, when a puncture breach occurs (a) in such a tank, (b) in the natural-rubber tank lining structure, per se, and (c) in the lining-protective barrier-layer material (thus to expose the natural-rubber lining structure to direct contact with that fuel), leaking fuel successfully reacts with the natural-rubber lining to initiate a reaction which is usually effective to seal such a wound.

However, and as has been suggested above, there has recently been developed a synthetic fuel, such as the synthetic fuel known as the above-mentioned FT synthetic fuel which changes the picture regarding this conventional fuel-leakage issue. To the surprise of everyone involved with decisions implemented to utilize this synthetic fuel, this fuel does not react with conventional natural-rubber-based anti-leakage liners on the occurrence of a puncture wound to invoke the anticipated liquid-imbibing and material-swelling wound-sealing action.

Explaining at this point certain terminology and phraseology which we employ herein, and to some extent have already employed above, the terms "stealth" and "stealth-reaction" are used to emphasize the fact that our liner, i.e., its body, is, until breached by a wound which exposes the above-mentioned, special, normally shrouded, internal "layer region" possessing the also-mentioned liquid-imbiber beads, inherently "silent" about its capability to respond to the onset of a fuel leak. Normal direct exposure of the un-breached (i.e., not yet penetrated) liner body does not trigger a response reaction. The liner does not, as distinguished sharply from structures in the prior art, require the added material cost, the added labor cost, and/or the added fuel-tank room-occupancy "cost" of any additional "guard" barrier against normal fuel contact.

Additionally, we refer to our liner as being "layer-effective", or as possessing a "layer-effect", in order to point out that while the liner body can be viewed as possessing layers, or regions, (preferably three) which furnish distinct, differential, but layer-cooperative, performances, the internal interfaces between these regions preferably (though not absolutely necessarily) take form of material continuities (i.e., no discontinuities) respecting the main elastomeric material which defines the principal, constituent element of the liner body. An important consequence of this preferred, "material-continuity" construction is that the entire body of elastomeric material responds with cooperative, distributed compression and tension, as dictated by wound-healing circumstances, when a wound exposes the central liquid-imbiber beads to fuel contact, with such contact producing the immediate result of rapid fuel imbibing and material swelling by the beads to seal the wound and stop fuel leakage. The entire transverse (across the layer regions) body portion of liner elastomeric material adjacent such a wound is, under leak-reaction circumstances, in compressive and tensive cooperation in aid of wound closure and sealing. Layer regions on opposite sides of the central, imbiber-bead-containing region, function as cooperative, compression-aiding regions enhancing the swelling, leak-sealing action which is created in the central liner region.

The present invention addresses the synthetic fuel-leak situation by proposing a unique, inside-tank (container), rubber-based (pure natural, or blended), or alternatively polyurethane-based or polyurea-based, liner which is designed specifically to react, as a result of a puncture wound, with synthetic FT fuel to create the desired liquid-imbibing and material-swelling wound-sealing actions. This newly proposed lining has the mentioned "stealth" characteristic, which, without requiring any additional barrier-layer material, and with the liner per se thus normally being fully in contact with tank-held synthetic fuel, prevents the liner from reacting normally, unexpectedly, and undesirably with such fuel, and does so until a leak-creating puncture breach occurs in the relevant tank wall and the liner body.

The liner of this invention fundamentally, and in its preferred and best-mode form, takes the form of a functionally layered (a layer-effective) body structure, preferably without any distinct inter-layer discontinuity boundaries, or distinct interfaces, which includes (a) at least two outer layer regions formed of pure natural rubber (or a natural rubber blend)

without any additives, and (b), effectively sandwiched between these outer layer regions, an intermediate layer region which (1) utilizes the same outer-layer-region "rubber" material, but which (2) also includes an embedded plurality of synthetic-fuel-reactive liquid-imbiber beads, such as those identified with the product designator IMB230300, made by Imbibitive Technologies America, Inc. in Midland, Mich.

In this newly proposed liner structure, since the basic liner material per se, that is, the material other than the embedded imbiber-bead material, is nonreactive directly to synthetic fuels, it may be placed, without any additional barrier structure, directly inside a fuel tank, normally against the inside surface, or surfaces, of the wall of that tank, and be normally fully exposed to synthetic fuel contact, without there being any risk of an undesirably triggered interaction between the synthetic tank fuel and the liner. An extra installation of a protective barrier structure is, accordingly, not required. It is only when a puncture wound occurs that exposes the inner (imbiber-bead) layer region of this liner to fuel leakage, that a reaction occurs between leaking fuel and the then exposed imbiber beads.

This reaction triggers a liquid-imbibing and material-congealing swelling action which rapidly functions to close the leak-initiating wound. The layer regions of liner material which are disposed on opposite sides, so-to-speak, of the central layer region which contains the liquid-imbiber beads, function, once a fuel-contact reaction begins with the liquid-imbiber beads, to furnish a compressive pressure around the area where reaction is occurring, thus enhancing the sealing ability of the liner structure.

As an illustration of one of a variety of appropriate manufacturing ways, an expanse of this newly proposed liner material may be created by the production of (1) independent, suitably thick mats of pure natural (or blended) rubber material, and (2) independent, suitably thick mats of the same natural or blended rubber material which are imbiber-bead-imbedded, which independent mats are then pressure-and-heat-consolidated into a unified, three-effective-layer lining structure. Pressure and heat consolidation function to "weld" the three layer regions into a unit lacking material discontinuities between the layer regions The assembled liner structure is then edge cut to appropriate shapes for fitting against the inside wall(s) of a selected fuel tank/container.

Another production approach which could be used, and which will create a modified form of liner, involves the use of not necessarily a natural (or blended) rubber material, but rather of an elastomeric polyurethane or polyurea material, and particularly such a material which is susceptible to casting in stages that are effective to build a layered structure such as that which has just been generally described where natural, etc. rubber is employed. Casting of plural layer regions, with appropriately shortened timings maintained between casting "pours", results in chemical interfacial bondings occurring between these regions to create the preferred, desired liner-body material continuity.

The various features and advantages which are offered by the liner structure of the present invention will now become more fully apparent as the description which shortly follows is read in conjunction with the accompanying drawings.

DETAILED DESCRIPTION OF THE INVENTION

Figure 1:
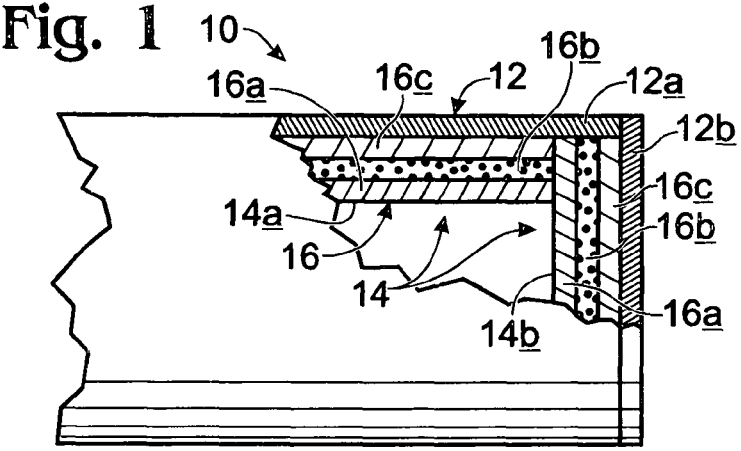
FIG. 1 is a fragmentary elevation, with structural portions broken away, illustrating a synthetic fuel tank which has been equipped on its inside with a liner made in accordance with a preferred and best-mode embodiment of the present invention.
Figure 2:
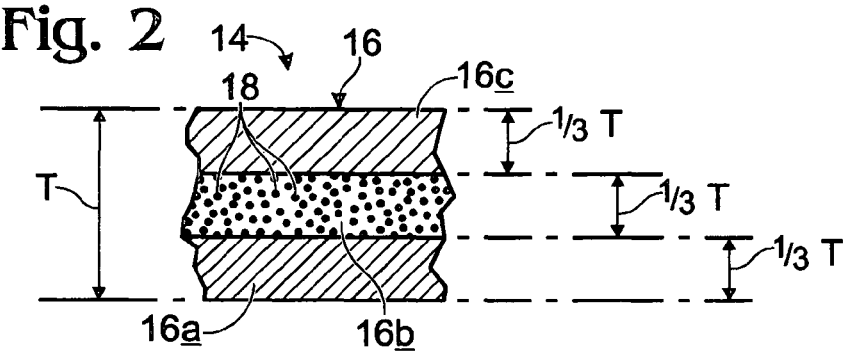
FIG. 2 is an enlarged, fragmentary cross section of a portion of the liner employed in the fuel tank shown FIG. 1.

Turning now to the drawings, and referring first of all to FIGS. 1 and 2, indicated generally and fragmentarily at 10 in FIG. 1 is a fuel-tank (container) assembly employing a preferred and best-mode embodiment of the liner of the present invention. Included in this assembly is a fuel tank 12, also referred to herein as a synthetic fuel tank, which designed to hold synthetic fuel, such as the specific FT type fuel mentioned above. While such a tank may, of course, have a number of different specific configurations, none of which plays any role, per se, in the structure and features of the present invention except to dictate the shapes of installed liner components/structure, tank 12 herein is generally cylindrical in configuration. It includes an elongate cylindrical wall 12a, and a pair of generally circular end walls, such as the single end wall shown at 12b, appropriately joined to opposite ends of the cylindrical wall. The material which makes up tank 12, and which is not relevant to the present invention, may be of any suitable type, such as stainless steel.

Installed within tank 12, in accordance with practice of the present invention, is an anti-fuel-leakage liner, or liner structure, 14 which has been made in accordance with a preferred and best-mode embodiment of the invention. Liner 14 is also referred to herein as a self-sealing, layer-effective (or layer-effect), stealth-reaction liner.

It should be pointed out at this point in the description of the invention that the various illustrated components of tank 12 and of liner 14 are not pictured herein in exact proportion with respect to one another, such being done for clarity of illustration purposes.

Held within tank 12, within the confines of installed liner 14, it is a body of FT synthetic fuel (not shown) as identified specifically hereinabove. As has been mentioned, also above, this synthetic fuel does not react with natural rubber, or with conventional, natural-rubber tank-lining products, such as those which have been described and mentioned briefly above as being characteristic of prior art tank-lining structures, designed to seal against conventional-fuel leakage.

As can be seen (at least in part) in FIG. 1, specifically disposed within tank 12 are plural liner-14 components, or portions—three in number—two only of which are indicated generally at 14a and 14b. Liner portion 14a is generally elongate and cylindrical in configuration, and is disposed within tank 12 so as to close completely around the inside surface of cylindrical tank wall 12a. Butting against, and joined, as will be explained, to the opposite ends of liner portion 14a are two, generally circular liner tank-end portions, such as portion 14b, which are disposed, generally as illustrated, against the entireties of the inside circular surfaces of tank end walls, such as tank end wall 12b.

With liner 14 disposed as shown within tank 12, FT synthetic fuel contained within the central region inside of the tank bounded by liner 14 is held in such a fashion that, normally, no fuel comes in contact with the inside surfaces of the fuel-tank structure, per se.

Focusing attention now particularly on FIG. 2, the preferred embodiment of liner 14 includes an elastomeric body 16 having a nominal thickness T, with body 16 including three, unified layers, or layer regions, 16a, 16b, 16c, each having a nominal thickness herein of about ⅓ T. Nominal thickness T preferably lies in the range of about 0.001- to about 0.250-inches. The interfacial regions, or interfaces, existing effectively between next-adjacent layer regions, which interfaces are indicated in FIG. 2 by darkened horizontal lines, are actually, and preferably, true elastomeric material continuities, i.e., interfaces without distinct boundaries. A consequence of this feature of the preferred embodiment of the invention is that the entirety of elastomeric body 16 acts, effectively, as a single, elastomeric unit, whereby tension and compression developed in any region in this unit is telegraphed, for cooperative interaction, by a continuity of elastomeric material to adjacent regions within body 16.

While such de facto material continuity is indeed the preferred construction in the interfacial zones between layer regions 16a, 16b, 16c, we recognize that there may be certain instances in which body layers, or layer regions, may in fact be simply tightly bonded to one another with special adhesives that replicate, to some extent, true material continuities. But we state again herein, that it is preferable that there be no distinct discontinuities between the several, and preferred three, layer regions within liner body 16.

The preferred elastomeric material for use in liner body 16 is either pure natural rubber, or natural rubber in a blend with other compatible, "elastomeric" materials that are typically blended in various applications with pure natural rubber. Other suitable elastomeric materials include castable, elastomeric polyurethane, and castable, elastomeric polyurea. Such material selection, within the parameters described herein, is effectively a matter of user choice.

Distributed as a liner-body-shrouded population within central layer region 16b are plural liquid-imbiber beads 18 of the kind mentioned earlier herein. This bead population is also referred to herein as a non-facially exposed, normally body-shrouded, central distribution of fuel-reactive liquid-imbiber beads. These beads are highly reactive to contact with FT synthetic fuel. On contact with such fuel, the beads react by imbibing that fuel rapidly, and swelling to create intense internal compression which, with cooperative assistance from body layer regions 16a, 16c, quickly effects a seal of any breach in the liner body which has caused the central region with the imbiber beads to become exposed to fuel contact. This action thus stems the continuance of a fuel leak from tank 12.

Although different percentages by volume of liquid-imbiber beads may be employed in layer region 16b, we have found that a very appropriate volume occupancy of such beads is about 20-percent.

While the structure of liner 14 has been described herein with a body 16 having three layers, or layer regions, we appreciate that those skilled in the art may determine that there are certain applications in which a different number of layer regions should be employed. We also recognize that, while the preferred embodiment of liner 14 includes a body 16 which has three, substantially equal-thickness layer regions, it is not necessary that the layer regions be equal in thickness. For example, in one modification of the invention, liner 16, including, say, three layer regions, might possess an "outer" layer region, such as layer region 16c, having a somewhat greater thickness than those of the other layer regions, which thicker layer region might be deployed directly against the inside surface of a fuel tank.

Figure 3:
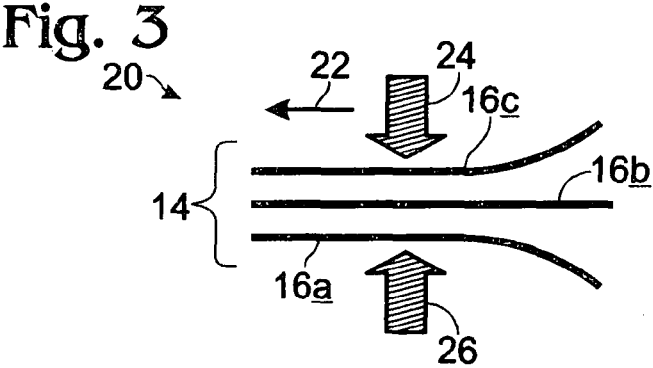
FIG. 3 is a smaller-scale, simplified and schematic illustration of one way of making the liner pictured in FIGS. 1 and 2.

Turning attention now to FIG. 3, here there is illustrated, generally at 20, one manner of fabricating the liner of the present invention, such as the preferred liner structure which is illustrated in FIGS. 1 and 2. In this fabrication manner, three, independent, suitably prepared pure-natural-rubber, or prepared blend based upon and including natural rubber, mats, which will become layers 16a, 16b, 16c, are fed generally in the direction of arrow 22 through an appropriate machine which compresses the mats into contact with one another, as indicated by shaded arrows 24, 26, with an appropriate level of heat, such as heat at a temperature of about 250°-300° F., employed to produce a kind of elastomeric, interfacial, material weld between the mats, thus to accomplish the desired liner body continuity of material which has been discussed hereinabove.

In this manufacturing process, the individual mats may be prepared/readied for assembly in any suitable fashion, with the central mat, which will become central layer region 16b, initially formed with an appropriate distribution of liquid-imbiber beads. Any suitable and conventional preparation technique for creating these mats, well within the skill levels of those generally skilled in the relevant art, may be employed. Such techniques do not form any part of the present invention.

Figure 4:
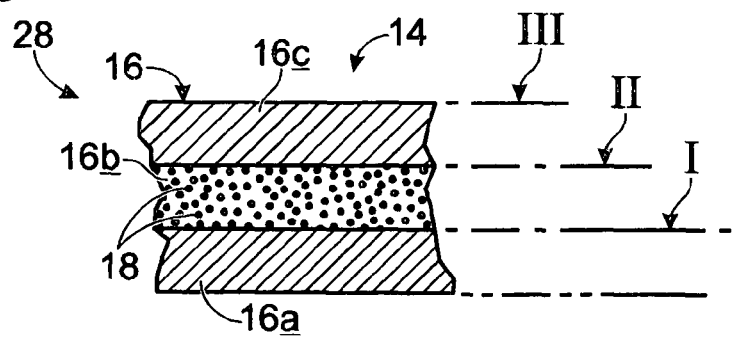
FIG. 4 presents, on a scale which is about the same as that used in FIG. 2, a fragmentary cross section of material layers illustrating one alternative way of making a liner similar to the liner illustrated in FIGS. 1 and 2.

FIG. 4 illustrates generally at 28 another suitable technique for fabricating liner 14. In this illustration, what is pictured is the formation, through casting, of liner body 16 and its layer regions, utilizing, preferably, castable, elastomeric polyurethane or castable, elastomeric polyurea. The three Roman numerals which are presented on the right side of FIG. 4 represent an ascending-order sequence in which the layers, or layer regions, within body 16 may be prepared. Liquid-imbiber beads are appropriately blended, in the preferred volume percentage mentioned above, in the second casting pour which forms central layer region 16b.

By performing the manufacturing technique pictured in FIG. 4 specifically in a manner wherein a relatively short time only is allowed to transpire between successive layer-region pours, the polyurethane or polyurea elastomeric material which makes up the main parts of the layers will bond chemically in the respective interfacial regions to establish, effectively, a continuity of liner-body elastomeric material like that which has been described above herein.

With liner body structure, or material, prepared in accordance with either of the two figures herein which generally illustrate the two, described fabrication techniques, selected pieces of this material are appropriately edge cut, and are subsequently suitably placed and fitted as components within the inside of a subject fuel tank, with this placement being done in any appropriate and convenient manner and order. Preferably, the components so placed inside a tank are shaped and placed in such a fashion that, where adjacent components contact one another, they are under compression relative to one another to create effectively a zero passageway for the escape of synthetic fuel which will later be introduced into the associated fuel tank. It may, in certain instances where pure natural rubber, or a natural-rubber-based blend, is used to form the liner-body elastomeric structure, be appropriate to apply a suitable heating temperature to a "completed" fuel tank which has been lined with the liner structure of the invention in order to cause material-weld-like joints to form in the regions where cut pieces of liner body material contact one another With the liner structure of the present invention installed appropriately in a synthetic fuel tank, when and if a puncture wound occurs which penetrates not only the fuel-tank container, per se, but also the entirety of the thickness of liner 14, immediately a leakage pathway is created which allows fuel in the tank to begin to escape. Such escaping fuel, on reaching the inner, or central, layer region within liner body 16, produces a reaction with the liquid-imbiber beads, which reaction results in the affected imbiber beads imbibing fuel, and swelling to create dramatic compressive pressure which is effective to seal the leak-initiating wound. With material continuity preferably defining the interfacial zones between layer regions as explained, the entire elastomeric body within the liner in the region adjacent such a wound reacts with distributed compression and tension to cooperate with swelling liquid-imbiber beads, thus to contribute to a vigorous, robust, and a very rapid, leakage-sealing action.

The invention thus proposes simple and elegant solution to the issue of preparing a synthetic fuel tank to be guarded against fuel leakage initiated by a puncture wound. It effectively solves the problem, mentioned earlier, encountered with the realization that the traditional approach of utilizing pure natural rubber, per se, directly as a seal-effective, reacting substance to respond to exposure to leaking fuel simply would not work in relation to responding to non-conventional, synthetic fuel.

Not only does the present invention effectively and efficiently address this problem completely, it does so in the context of offering a solution which involves a much simpler, leakage-stemming structure, ultimately, to accomplish fuel-leakage control. More specifically, and as has already been pointed out, the liner of the present invention requires neither the presence nor the material and installation costs of additional barrier structure to prevent it, per se, from normally contacting contained fuel. Rather, the liner of the invention relies upon the presence of a shrouded, "stealth", internal layer region that contains synthetic-fuel-reactive liquid-imbiber beads which do not become exposed to a fuel until a puncture wound occurs, notwithstanding the fact that the outside of the elastomeric body in which these beads are embedded is, under all circumstances, at least on its inner surface, continually exposed to contained fuel.

From a practice-functional point of view, the invention uniquely features a method preparatory for guarding, from the inside, a synthetic fuel container against puncture-wound leakage, including preparing, for installation in such a container, (a) a fuel-container liner with a non-fuel-reactive, substantially continuous-material elastomeric body having opposite faces, and (b) within that body, a non-facially exposed, normally body-shrouded, central distribution of fuel-reactive liquid-imbiber beads. The method further includes installing the prepared liner in the container.

Accordingly, while a preferred embodiment of the invention, and modified forms thereof, as well as associated fuel-container-protection methodology have been disclosed, illustrated and described herein, we appreciate that variations and modifications may be made without departing from the spirit of the invention

We claim:

1. A self-sealing, layer-effect, stealth-reaction liner for sealing against fuel leakage from the wound-punctured wall of a Fisher-Tropsch (FT) synthetic liquid fuel container comprising
    an elastomeric liner body having plural layers and applied to the interior of an FT synthetic liquid fuel container having an overall predetermined thickness defined by spaced, opposite faces, and formed of a material which is non-reactive to FT fuel, said plural layers including an inner layer which is in contact, in general usage, with the FT synthetic liquid fuel and
    nominally shrouded in a region within the predetermined thickness of the liner body, inwardly of said faces, a preselected layer distribution of liquid-imbiber beads which react upon contact with FT fuel to initiate a liquid-imbibing and material-swelling activity.

2. The liner of claim 1, wherein the elastomeric material is one of (a) natural rubber, (b) natural rubber blended with at least one other material, (c) castable polyurethane, and (d) castable polyurea.

3. The liner of claim 1, wherein said region occupies a defined volume within said liner body, and said distribution of beads accounts for about 20% by volume of said defined volume.

4. The liner of claim 1, wherein the predetermined liner-body thickness preferably lies in the range of about 0.100- to about 0.250-inches.

* * * * *